(12) United States Patent
Tsuchiya

(10) Patent No.: US 11,095,006 B2
(45) Date of Patent: Aug. 17, 2021

(54) BATTERY RECEIVING TERMINAL STRUCTURE

(71) Applicant: FDK CORPORATION, Tokyo (JP)

(72) Inventor: Katsuki Tsuchiya, Tokyo (JP)

(73) Assignee: FDK CORPORATION, Tokyo (JP)

( * ) Notice: Subject to any disclaimer, the term of this patent is extended or adjusted under 35 U.S.C. 154(b) by 57 days.

(21) Appl. No.: 16/243,922

(22) Filed: Jan. 9, 2019

(65) Prior Publication Data

US 2019/0245187 A1 Aug. 8, 2019

(30) Foreign Application Priority Data

Jan. 11, 2018 (JP) ............................. JP2018-002708

(51) Int. Cl.

| | | |
|---|---|---|
| *H01M 2/30* | (2006.01) | |
| *H02J 7/00* | (2006.01) | |
| *H01M 10/04* | (2006.01) | |
| *H01M 50/543* | (2021.01) | |
| *H01M 50/213* | (2021.01) | |
| *H01M 50/572* | (2021.01) | |

(52) U.S. Cl.
CPC ..... *H01M 50/543* (2021.01); *H01M 10/0422* (2013.01); *H01M 50/213* (2021.01); *H01M 50/572* (2021.01); *H02J 7/0045* (2013.01)

(58) Field of Classification Search
CPC ..... H01M 2/30; H01M 10/0422; H02J 7/0045
USPC ........................................................ 320/110
See application file for complete search history.

(56) References Cited

U.S. PATENT DOCUMENTS

| | | | |
|---|---|---|---|
| 5,077,514 A | 12/1991 | Tribbey et al. | |
| 7,187,156 B2* | 3/2007 | Nakasho et al. | H02J 7/0045 |
| | | | 320/107 |
| 7,589,493 B2 | 9/2009 | Satsuma | |

(Continued)

FOREIGN PATENT DOCUMENTS

JP 2015524245 A 8/2015

OTHER PUBLICATIONS

Extended European Search Report dated May 28, 2019, received for corresponding European Application No. 19151223.5.

*Primary Examiner* — Sun J Lin
(74) *Attorney, Agent, or Firm* — Kinney & Lange, P.A.

(57) ABSTRACT

A terminal structure satisfies the relationships of $D1<T1<D2$ and $T1<T2=D2$ where D1 is the length of a body part of a secondary battery, D2 is the total length of the secondary battery, T1 is a first inter-contact-terminal distance between a portion of a positive-electrode-side contact terminal and a portion of and a negative-electrode-side contact terminal when the secondary battery is not present between the positive-electrode-side contact terminal and the negative-electrode-side contact terminal, and T2 is a second inter-contact-terminal distance between the portion of the positive-electrode-side contact terminal and the portion of and the negative-electrode-side contact terminal when the secondary battery is held between the positive-electrode-side contact terminal and the negative-electrode-side contact terminal, the portion of the positive-electrode-side contact terminal and the portion of the negative-electrode-side contact terminal coming into contact with the positive electrode terminal and the negative electrode terminal of the secondary battery, respectively.

4 Claims, 6 Drawing Sheets

(56) References Cited

U.S. PATENT DOCUMENTS

| | | | | |
|---|---|---|---|---|
| 7,626,357 B2* | 12/2009 | Hoffman et al. | ..... | H02J 7/0045 |
| | | | | 320/110 |
| 7,816,886 B2* | 10/2010 | Brandon, II et al. | ........................ | |
| | | | | H02J 7/00047 |
| | | | | 320/110 |
| 8,183,830 B2* | 5/2012 | Law | ...................... | H02J 7/0045 |
| | | | | 320/110 |
| 8,242,740 B2* | 8/2012 | Toya et al. | ............ | H02J 7/0045 |
| | | | | 320/107 |
| 2007/0069688 A1* | 3/2007 | Satsuma | ............... | H02J 7/0042 |
| | | | | 320/110 |
| 2013/0169228 A1* | 7/2013 | Yang | ................... | H02J 2207/20 |
| | | | | 320/110 |
| 2013/0320924 A1 | 12/2013 | Merrill et al. | | |
| 2017/0294631 A1 | 10/2017 | Liu et al. | | |

* cited by examiner

BATTERY RECEIVING TERMINAL STRUCTURE

BACKGROUND OF THE INVENTION

Field of the Invention

The present invention relates to a terminal structure, and more particularly to a terminal structure for a positive-electrode-side contact terminal and a negative-electrode-side contact terminal in an apparatus to be loaded with a secondary battery, the positive-electrode-side contact terminal and the negative-electrode-side contact terminal being brought into contact with a positive electrode terminal and a negative electrode terminal, respectively, of the secondary battery.

Description of the Related Art

Rechargeable cylindrical secondary batteries have been widely used as the power sources for various apparatuses.

In a general cylindrical secondary battery, portions excluding a positive electrode terminal and a negative electrode terminal are covered with an insulating layer, for example, an insulating resin film or the like, to prevent an external short circuit. Examples of commonly used cylindrical secondary batteries include alkaline secondary batteries, and lithium ion secondary batteries.

A battery-driven apparatus using a battery as the power source is provided with a battery compartment for holding a cylindrical secondary battery, and the cylindrical secondary battery is placed in the battery compartment. The battery compartment is provided with a positive-electrode-side contact terminal which is brought into contact with the positive electrode terminal of the cylindrical secondary battery, and a negative-electrode-side contact terminal which is brought into contact with the negative electrode terminal of the cylindrical secondary battery. The cylindrical secondary battery is held and retained between the positive-electrode-side contact terminal and the negative-electrode-side contact terminal in the battery compartment. In this state, the cylindrical secondary battery discharges, and supplies electricity to the battery-driven apparatus.

Once the cylindrical secondary battery is used and the battery capacity is decreased, the cylindrical secondary battery is removed from the battery compartment of the battery-driven apparatus and then charged by a charging device. The charging device includes a charging section in which the cylindrical secondary battery is to be placed. The cylindrical secondary battery is placed in the charging section and charging operation is performed. The cylindrical secondary battery which has been fully charged in the charging operation is removed from the charging section and is again put in the battery compartment of a target battery-driven apparatus and used for driving the battery-driven apparatus. In this way, the cylindrical secondary battery is recharged and repeatedly used.

In the charging section of the above charging device, there are provided a positive-electrode-side contact terminal which is brought into contact with the positive electrode terminal of the cylindrical secondary battery, and a negative-electrode-side contact terminal which is brought into contact with the negative electrode terminal of the cylindrical secondary battery. In the charging section, the cylindrical secondary battery is held and retained between the positive-electrode-side contact terminal and the negative-electrode-side contact terminal. Then, the cylindrical secondary battery is charged by causing an electric current to flow in this state.

Here, as the charging device, for example, a small charging device that charges a small number of or no more than four cylindrical secondary batteries has been known. This small charging device is a charging device generally used in households, and has four charging sections, each holding one cylindrical secondary battery. The charging device in which the cylindrical secondary batteries are placed in the respective charging sections is connected to a power source, whereby charging is performed.

Moreover, in an environment where a great amount of cylindrical secondary batteries are used for business, etc., an automatic charging device for business use, which can automatically and continuously charge a great amount of cylindrical secondary batteries, has been known. An example of such an automatic charging device is a charging device disclosed in Japanese Unexamined Patent Publication No. 2015-524245. An automatic charging device for business use basically has a hopper for inserting a great amount of cylindrical secondary batteries (in an uncharged state), a barrel for sequentially moving the cylindrical secondary batteries inserted in the hopper within the automatic charging device, a charging section for holding and charging the moved cylindrical secondary battery at a predetermined position, and a battery chute for discharging the cylindrical secondary battery (in a fully charged state) which has been charged in the charging section. In the automatic charging device for business use, when used cylindrical secondary batteries with decreased capacity are inserted into the hopper, the cylindrical secondary batteries are automatically charged in sequence, and the fully charged secondary batteries are collected in the battery chute.

In the case where a decrease in the battery capacity makes it difficult to drive the battery-driven apparatus, an operator removes the used cylindrical secondary battery whose capacity has decreased from the battery-driven apparatus, and inserts the battery into the hopper of the automatic charging device. Then, the operator takes out a completely charged cylindrical secondary battery collected in the battery chute of the automatic charging device and places it in the battery-driven apparatus, the battery-driven apparatus can be driven again and the operation can be immediately resumed.

The positive-electrode-side contact terminal and the negative-electrode-side contact terminal, which are provided in the battery compartment of the above battery-driven apparatus or in the charging section of the charging device, are formed from an elastic material and exert relatively high pressing forces in the compressing direction along the axis line of the cylindrical secondary battery so as to stabilize conductivity. Specifically, the distance between the positive-electrode-side contact terminal and the negative-electrode-side contact terminal is made as short as possible in order to increase the pressing forces exerted on the cylindrical secondary battery.

By the way, when putting the cylindrical secondary battery in the battery compartment or the charging section, or when detaching the cylindrical secondary battery from the battery compartment or the charging section, the edge portions of the cylindrical secondary battery rub against the positive-electrode-side contact terminal and the negative-electrode-side contact terminal while receiving the high pressing forces from the positive-electrode-side contact terminal and the negative-electrode-side contact terminal. Therefore, at the edge portions of the cylindrical secondary battery, damage or breakage may occur in the insulating layer formed of the insulating resin film.

Here, as shown in FIG. 9, in a cylindrical nickel-hydrogen secondary battery 105 which is a kind of alkaline secondary battery, an outer can 130 has the same potential as that of a negative electrode terminal 136, and a potential difference with respect to a positive electrode terminal 134. When such a nickel-hydrogen secondary battery 105 is put in between a positive-electrode-side contact terminal 152 and a negative-electrode-side contact terminal 154, or conversely removed from between the positive-electrode-side contact terminal 152 and the negative-electrode-side contact terminal 154, an edge portion 170 on the positive electrode side rubs against the positive-electrode-side contact terminal 152 as shown in FIG. 9. At this time, since the positive-electrode-side contact terminal 152 and the negative-electrode-side contact terminal 154 exert comparatively high pressing forces to the nickel-hydrogen secondary battery 105, an insulating layer 142 of the edge portion 170 may be broken by rubbing as described above. When the insulating layer 142 is broken in this manner, as shown in circle A in FIG. 9, a portion of the positive-electrode-side contact terminal 152 comes into contact with the outer can 130 having the same potential as that of the negative electrode terminal 136. Then, another portion of the positive-electrode-side contact terminal 152 comes into contact with the positive electrode terminal 134. Consequently, an external short circuit occurs. If the external short circuit occurs, an excessive electric current flows in the nickel-hydrogen secondary battery 105. As a result, the nickel-hydrogen secondary battery 105 may generate heat or leak.

SUMMARY OF THE INVENTION

A terminal structure of the present invention is a terminal structure for a positive-electrode-side contact terminal and a negative-electrode-side contact terminal in an apparatus to be loaded with a cylindrical secondary battery, the cylindrical secondary battery including a cylindrical body part whose surface is insulated with an insulating layer, a positive electrode terminal protruding from one end of the body part and a negative electrode terminal located and exposed at the other end of the body part, the positive-electrode-side contact terminal and the negative-electrode-side contact terminal being brought into contact with the positive electrode terminal and the negative electrode terminal, respectively, of the cylindrical secondary battery, wherein the terminal structure satisfies the relationships of $$D1<T1<D2$$

and $$T1<T2=D2$$

where D1 is the length of the body part, D2 is the total length of the cylindrical secondary battery corresponding to a length from the tip of the positive electrode terminal to the negative electrode terminal, T1 is an inter-contact-terminal distance when the cylindrical secondary battery is not present between the positive-electrode-side contact terminal and the negative-electrode-side contact terminal, the inter-contact-terminal distance being the length between a portion of the positive-electrode-side contact terminal which comes into contact with the positive electrode terminal and a portion of the negative-electrode-side contact terminal which comes into contact with the negative electrode terminal, and T2 is the inter-contact-terminal distance when the cylindrical secondary battery is held between the positive-electrode-side contact terminal and the negative-electrode-side contact terminal.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

An automatic charging device 10 to which a terminal structure 1 according to the present invention is applied will be described below with reference to the drawings.

The automatic charging device 10 is a device for continuously and automatically charging uncharged cylindrical secondary batteries, for example, AA size nickel-hydrogen secondary batteries (hereinafter referred to as secondary batteries 5).

Figure 1:
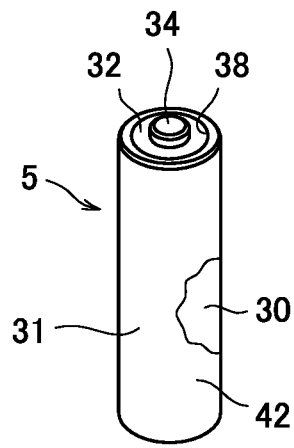
FIG. 1 is a perspective view showing a state in which the positive electrode terminal side of a cylindrical secondary battery faces upward.
Figure 2:
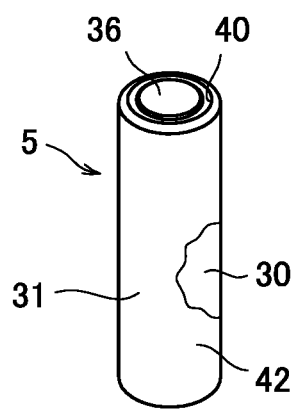
FIG. 2 is a perspective view showing a state in which the negative electrode terminal side of the cylindrical secondary battery faces upward.

Here, as shown in FIGS. 1 and 2, the secondary battery 5 includes a cylindrical body part 31, a positive electrode terminal 34 protruding from one end of the body part 31, and a negative electrode terminal 36 located at the other end of the body part 31.

The body part 31 includes an outer can 30 in the shape of a cylinder with a bottom, a cap plate 32 closing an opening on one end of the outer can 30, and an insulating layer 42 formed of a resin film covering a range from a rim portion 38 on the one end of the outer can 30 closed with the cap plate 32 to a rim portion 40 on the other end of the outer can 30 through a circumferential side surface of the outer can 30. An electrode group (not shown) is housed together with an alkaline electrolyte in the outer can 30.

The positive electrode terminal 34 is a flat columnar member arranged to protrude from an outer surface of the cap plate 32 at the center of the cap plate 32.

The bottom wall of the outer can 30 also serves as the negative electrode terminal 36. Specifically, a circular table-like portion slightly raised from the rim portion 40 at the center portion of the bottom wall of the outer can 30 is used as the negative electrode terminal 36. This portion of the negative electrode terminal 36 is exposed without being covered with the insulating layer 42.

Figure 3:
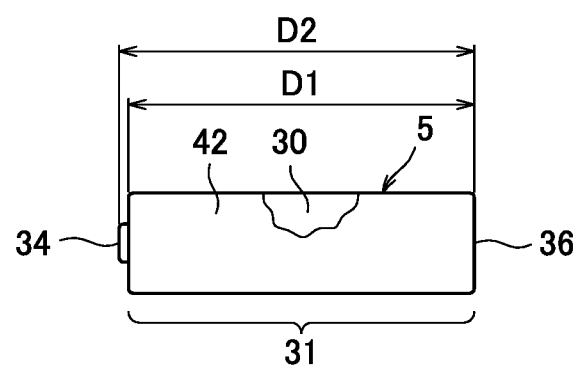
FIG. 3 is a side view of the cylindrical secondary battery.

In this secondary battery 5, as shown in FIG. 3, the length from one end to the other end of the body part 31 is defined as a length D1 of the body part, and the total length of the secondary battery 5 corresponding to the length from the tip of the positive electrode terminal 34 to the negative electrode terminal 36 is denoted by D2.

Figure 4:
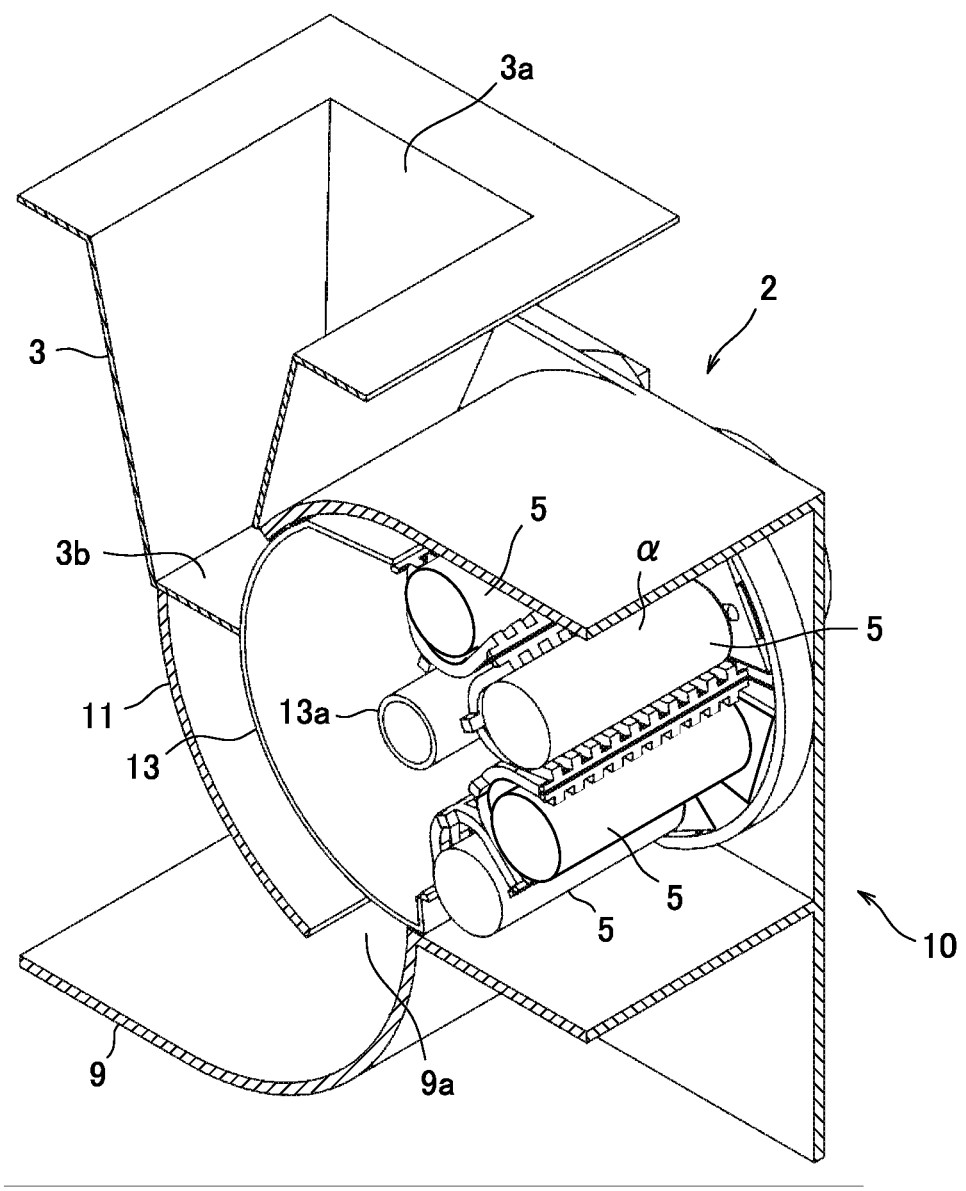
FIG. 4 is a partially broken perspective view showing an automatic charging device for secondary batteries according to one embodiment of the present invention.

Next, the structure of the automatic charging device 10 will be described. Reference numeral 2 in FIG. 4 represents a main body (only a part of which is shown) of the automatic charging device 10 formed in a box shape by for example, a combination of panels. Provided on the upper side of the main body 2 is a hopper 3 having an entrance section 3a at the top, and an exit section 3b facing sideward at the lower part. The hopper 3 is structured such that when the uncharged secondary batteries 5 are inserted from the entrance section 3a of the hopper 3, the hopper 3 sequentially guides the secondary batteries 5 to the exit section 3b having a long narrow opening located at the lower end of the hopper 3 while arranging the secondary batteries 5 in a line (a row).

A battery chute 9 for storing the charged secondary battery 5 is provided in the lower part of the main body 2, located on the lower side of the hopper 3. The battery chute 9 has an entrance section 9a that opens upward. A housing 11 is provided between the entrance section 9a of the battery chute 9 and the exit section 3b of the hopper 3 so that the housing 11 is internally in contact with the entrance section 9a and the exit section 3b. A rotatably driven barrel 13 is put in the housing 11.

Figure 5:
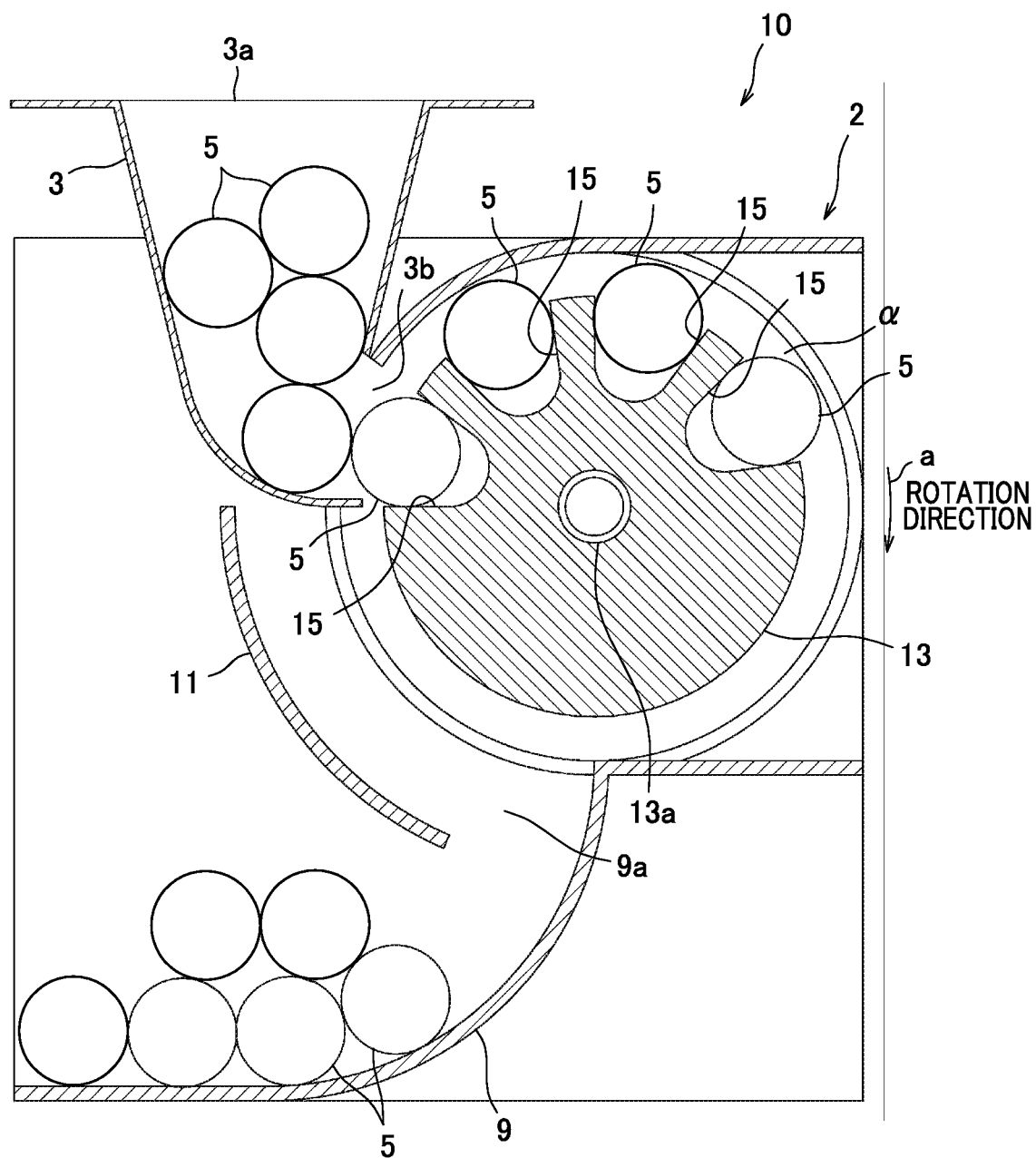
FIG. 5 is a cross-sectional view of the automatic charging device for secondary batteries according to one embodiment of the present invention.

For example, as shown in FIG. 5, the barrel 13 is formed of a cylindrical drum having a rotating shaft part 13a at the center. The rotating shaft part 13a of the barrel 13 is connected to an output shaft of a drive motor (driving source) (not shown). The barrel 13 is configured to be rotated as a whole in the direction indicated by an arrow a around the rotating shaft part 13a by the operation of the drive motor. In FIG. 5, for simplifying the drawing, the barrel 13 is illustrated as a solid barrel rather than a cylindrical barrel as in FIG. 4.

On the outer circumferential part of the barrel 13, for example, a plurality of slots, for example, four slots 15 are arranged at predetermined intervals in a circumferential direction, within a predetermined range in the circumferential direction. Each of the slots 15 is configured to receive the cylindrical secondary battery (secondary battery 5) in a stable posture one by one from the exit section 3b of the hopper 3.

The secondary battery 5 inserted in the slot 15 is guided to a charging section α located at a position adjacent to the hopper 3 by a rotational displacement of the barrel 13. In the charging section α, for example, a contact terminal pair 17 formed by the positive-electrode-side contact terminal 52 which is brought into contact with the positive electrode terminal 34 of the secondary battery 5 and the negative-electrode-side contact terminal 54 which is brought into contact with the negative electrode terminal 36 of the secondary battery 5 is provided at predetermined positions on a first internal wall 50 and a second internal wall 51 of the main body 2 located on both sides of the slot 15. For example, four sets of the contact terminal pair 17 are provided. In the charging section α, the barrel 13 is rotationally displaced such that each secondary battery 5 is placed in each contact terminal pair 17. In this structure, four secondary batteries 5 are charged at a time. After completion of charging, the slot 15 comes to the entrance section 9a of the battery chute 9 from the charging section α with the rotational displacement of the barrel 13. In short, the secondary battery 5 is removed from the contact terminal pair 17 in the charging section α and discharged toward the battery chute 9. When the secondary batteries 5 are moved and charged as described above, the secondary batteries 5 in a fully charged state are collected in the section of the battery chute 9.

Here, the terminal structure 1 of the positive-electrode-side contact terminal 52 and the negative-electrode-side contact terminal 54 in the charging section α will be described.

Figure 6:
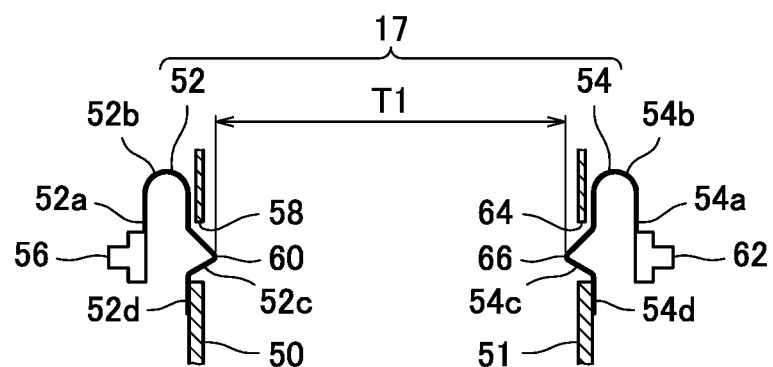
FIG. 6 is a configuration diagram showing the positional relationship between the positive-electrode-side contact terminal and the negative-electrode-side contact terminal in a state where no cylindrical secondary battery is present.
Figure 7:
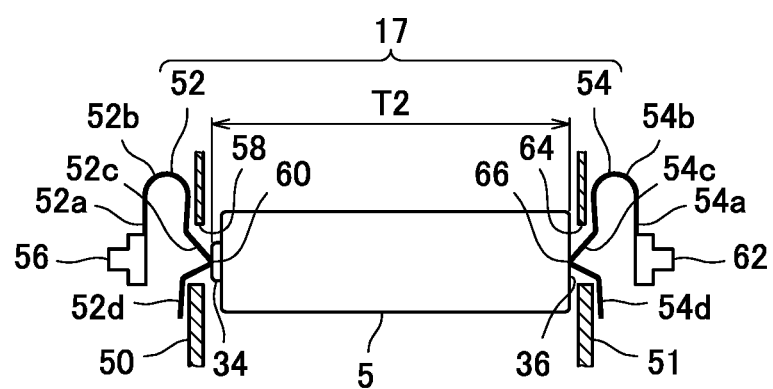
FIG. 7 is a configuration diagram showing the positional relationship between the positive-electrode-side contact terminal and the negative-electrode-side contact terminal in a state where a cylindrical secondary battery is held therebetween.

The positive-electrode-side contact terminal 52 is formed by bending a metal thin plate into a predetermined shape. Specifically, as shown in FIGS. 6 and 7, the positive-electrode-side contact terminal 52 is formed such that a proximal end portion 52a of the thin plate is connected to a first proximal-end connection section 56, and a portion from the proximal end portion 52a to the middle portion of the thin plate is a curved portion 52b which is curved to have spring characteristics. In a portion ahead of the curved portion 52b, a contact portion 52c which is brought into contact with the positive electrode terminal 34 of the secondary battery 5 is formed. As is clear from FIGS. 6 and 7, the contact portion 52c has a triangular shape. A part of the triangular contact portion 52c protrudes from a first through-hole 58 provided at a predetermined position on the first internal wall 50. Further, a linear distal-end stopper portion 52d extends beyond the contact portion 52c of the thin plate. The distal-end stopper portion 52d abuts against the first internal wall 50 and functions to restrict the triangular contact portion 52c from protruding further from the first through-hole 58. The first proximal-end connection section 56 is electrically connected to a power source (not shown) that supplies an electric current for charging.

The negative-electrode-side contact terminal 54 is located at a position opposed to the above-described positive-electrode-side contact terminal 52. The negative-electrode-side contact terminal 54 is formed by bending a thin metal plate into a shape that is bilaterally symmetrical to the above-described positive-electrode-side contact terminal 52. More specifically, as shown in FIGS. 6 and 7, the negative-electrode-side contact terminal 54 is formed such that a proximal end portion 54a of the thin plate is connected to a second proximal-end connection section 62, and a portion from the proximal end portion 54a to a middle portion of the thin plate is a curved portion 54b which is curved to have spring characteristics. A contact portion 54c which is brought into contact with the negative electrode terminal 36 of the secondary battery 5 is formed at a portion ahead of the curved portion 54b. As is clear from FIGS. 6 and 7, the contact portion 54c has a triangular shape. A part of the triangular contact portion 54c protrudes from a second through-hole 64 provided at a predetermined position on the second internal wall 51. Further, a linear distal-end stopper portion 54d extends beyond the contact portion 54c of the thin plate. The distal-end stopper portion 54d abuts against the second internal wall 51 and functions to restrict the triangular contact portion 54c from protruding further from the second through-hole 64. The second proximal-end connection section 62 is electrically connected to the power source (not shown) that supplies an electric current for charging.

Here, the length between an apex 60 of the triangular contact portion 52c of the positive-electrode-side contact terminal 52, which is the portion actually touching the positive electrode terminal 34 of the secondary battery 5, and an apex 66 of the triangular contact portion 54c of the negative-electrode-side contact terminal 54, which is the portion actually touching the negative electrode terminal 36 of the secondary battery 5, is defined as the inter-contact-terminal distance. Further, as shown in FIG. 6, the inter-contact-terminal distance in a state where the secondary battery 5 is not present between the positive-electrode-side contact terminal 52 and the negative-electrode-side contact terminal 54 is defined as a first inter-contact-terminal distance T1, and, as shown in FIG. 7, the inter-contact-terminal distance in a state where the positive-electrode-side contact terminal 52 contacts the positive electrode terminal 34 of the secondary battery 5 and the negative-electrode-side contact terminal 54 contacts the negative electrode terminal 36 of the secondary battery 5 and holds the secondary battery 5 therebetween is defined as a second inter-contact-terminal distance T2.

Moreover, in the terminal structure 1 of the present invention, the following relationships are satisfied.

$$D1 < T1 < D2$$

$$T1 < T2 = D2$$

Figure 8:
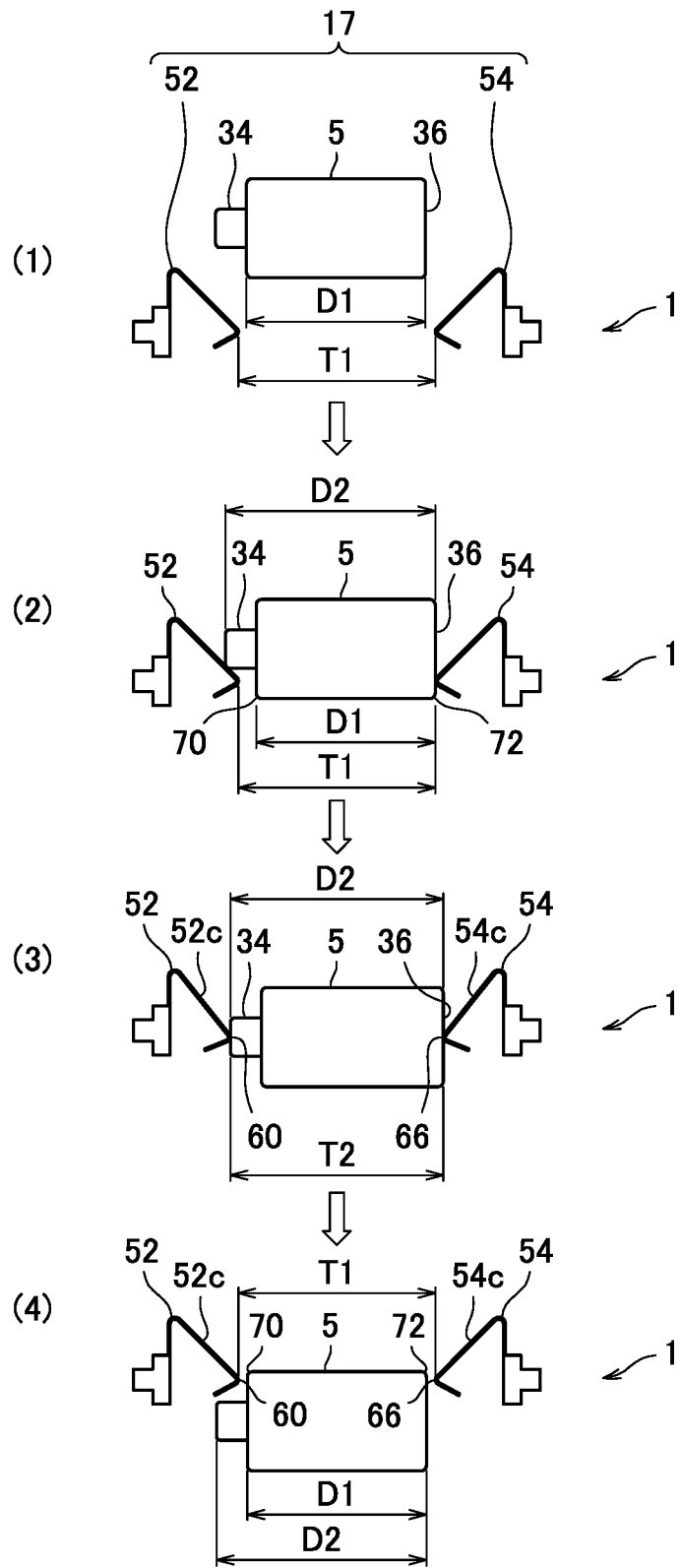
FIG. 8 is a configuration diagram showing the steps of movement of the cylindrical secondary battery between the positive-electrode-side contact terminal and the negative-electrode-side contact terminal.
Figure 9:
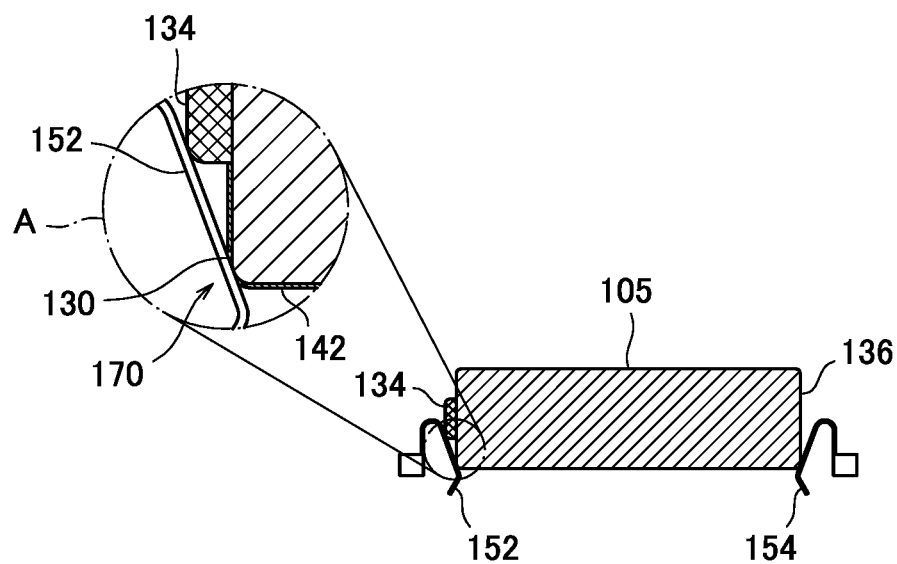
FIG. 9 is a configuration diagram for explaining a problem of a conventional terminal structure.

The function of the terminal structure 1 configured to satisfy such relationships will be described with reference to FIGS. 5 and 8. In FIG. 8, in order to facilitate understanding of the above relationships, the shapes of the positive-electrode-side contact terminal 52 and the negative-electrode-side contact terminal 54 are illustrated in a simplified manner and the shape of the secondary battery 5 is illustrated in an exaggerated manner.

As shown in FIG. 5, first, assume that a large number of uncharged AA size secondary batteries 5 are stored in the hopper 3. From this state, the automatic charging device 10 is driven.

Then, the barrel 13 is started to rotate (in the direction of arrow a) by the drive motor. When the slot 15 comes to the exit section 3b of the hopper 3, the secondary battery 5 that has reached the same point enters into the slot 15 from the exit section 3b of the hopper 3.

In this manner, only one AA size secondary battery 5 is received in each slot 15. Further, the secondary batteries 5 are sequentially moved toward the charging section α located on the forward side in the rotation direction of the barrel 13. Then, as shown in (1) in FIG. 8, the secondary battery 5 approaches the contact terminal pair 17 of the positive-electrode-side contact terminal 52 and the negative-electrode-side contact terminal 54.

Further, when the secondary battery 5 is moved, as shown in (2) in FIG. 8, the positive electrode terminal 34 of the secondary battery 5 contacts the positive-electrode-side contact terminal 52, and the negative electrode terminal 36 of the secondary battery 5 contacts the negative-electrode-side contact terminal 54. At this time, since the first inter-contact-terminal distance T1 is set to a value greater than the length D1 of the body part of the secondary battery 5 and smaller than the total length D2 of the secondary battery 5, the positive-electrode-side contact terminal 52 is restricted from contacting an edge portion 70 on the positive electrode side of the secondary battery 5. The negative-electrode-side contact terminal 54 contacts an edge portion 72 on the negative electrode side of the secondary battery 5, but, since the relationship D1<T1 is satisfied, the negative-electrode-side contact terminal 54 does not exert a high pressing force to the edge portion 72 on the negative electrode side of the secondary battery 5. Even if the positive-electrode-side contact terminal 52 contacts the edge portion 70 on the positive electrode side of the secondary battery 5, since the relationship D1<T1 is satisfied, the positive-electrode-side contact terminal 52 will not exert a high pressing force to the edge portion 70 on the positive electrode side of the secondary battery 5.

When the movement of the secondary battery 5 further proceeds, as shown in (3) in FIG. 8, the secondary battery 5 is held between the contact portion 52c of the positive-electrode-side contact terminal 52 and the contact portion 54c of the negative-electrode-side contact terminal 54. At this time, T2=D2. Since T2 is greater than T1, the positive-electrode-side contact terminal 52 and the negative-electrode-side contact terminal 54 are pushed in the directions away from each other and are elastically deformed. Due to the reaction, a pressing force to compress in the axial direction acts on the secondary battery 5, the positive electrode terminal 34 receives the pressing force from the positive-electrode-side contact terminal 52, and the negative electrode terminal 36 receives the pressing force from the negative-electrode-side contact terminal 54, thereby ensuring a stable conduction state. The secondary battery 5 is charged by causing an electric current to flow in this state.

When the charging is completed, as shown in (4) in FIG. 8, with a rotational displacement of the barrel 13, the secondary battery 5 which has finished charging is removed from the section of the contact terminal pair 17 of the positive-electrode-side contact terminal 52 and the negative-electrode-side contact terminal 54 in the charging section. In this case also, since the first inter-contact-terminal distance T1 is set to the value greater than the length D1 of the body part of the secondary battery 5 and smaller than the total length D2 of the secondary battery 5, the positive-electrode-side contact terminal 52 is restricted from contacting the edge portion 70 on the positive electrode side of the secondary battery 5, and the negative-electrode-side contact terminal 54 is restricted from contacting the edge portion 72 on the negative electrode side of the secondary battery 5. Even if the positive-electrode-side contact terminal 52 contacts the edge portion 70 on the positive electrode side of the secondary battery 5 or the negative-electrode-side contact terminal 54 contacts the edge portion 72 on the negative electrode side of the secondary battery 5, a high pressing force will not be exerted on the edge portion 70 on the positive electrode side and the edge portion 72 on the negative electrode side of the secondary battery 5.

Subsequently, the secondary battery 5 which has finished charging comes to the entrance section 9a of the battery chute 9, and is discharged to the battery chute 9 from the slot 15. In this manner, as shown in FIG. 5, the secondary batteries 5 which have finished charging are sequentially stored and collected in the battery chute 9. Hence, the secondary batteries 5 can be used for a battery-driven apparatus.

As described above, according to the terminal structure 1 of the present invention, when putting in or removing the secondary battery 5 between the positive-electrode-side contact terminal 52 and the negative-electrode-side contact terminal 54, it is possible to prevent the positive-electrode-side contact terminal 52 and the negative-electrode-side contact terminal 54 from rubbing against the edge portions 70 and 72 on the positive electrode side and the negative electrode side of the secondary battery 5 while exerting high pressing forces. Therefore, it is possible to avoid breakage of the insulating layer 42 of the secondary battery 5 and prevent occurrence of an external short circuit.

EXAMPLES

Example 1

In the charging section α of the above-described automatic charging device 10, the terminal structure was formed by setting the first inter-contact-terminal distance T1 to 49.4 mm, the length D1 of the body part of the secondary battery 5 to 48.6 mm, and the total length D2 of the secondary battery 5 to 50.2 mm (the second inter-contact-terminal distance T2 to 50.2 mm).

Twenty nickel-hydrogen secondary batteries having the above dimensions D1 and D2 were prepared, and were repeatedly charged 500 times using the above automatic charging device 10.

After repeating the charging operation, the edge portions of the nickel-hydrogen secondary batteries were observed, and the presence or absence of breakage of the insulating layer was inspected. As a result, there was no battery in which breakage of the insulating layer occurred.

It is understood from the results that occurrence of an external short circuit of the battery during charging can be prevented with the use of the terminal structure according to the present invention.

Comparative Example 1

The terminal structure was formed in the same manner as in Example 1 except that the first inter-contact-terminal distance T1 was 47.8 mm, and the nickel-hydrogen secondary batteries were repeatedly charged in the same manner as in Example 1.

After repeating the charging operation, the edge portions of the nickel-hydrogen secondary batteries were observed, and the presence or absence of breakage of the insulating layer was inspected. As a result, there were two batteries in which breakage of the insulating layer occurred.

It is understood from the results that when the terminal structure according to Comparative Example 1 is used, an external short circuit of the battery may occur during charging.

It should be noted that the present invention is not limited to the above-described embodiment and example, and various modifications are possible. The application of the terminal structure of the present invention is not limited to automatic charging devices, and may include small charging devices which are generally used in households. Moreover, the terminal structure of the present invention can be applied not only to a charging device, but also to a battery holding section of a battery-driven electric apparatus.

Further, the batteries to be used are not limited to nickel-hydrogen secondary batteries, and may be alkaline secondary batteries such as nickel-cadmium secondary batteries, or lithium ion secondary batteries.

Aspects of the Invention

A first aspect of the present invention is a terminal structure for a positive-electrode-side contact terminal and a negative-electrode-side contact terminal in an apparatus to be loaded with a cylindrical secondary battery, the cylindrical secondary battery including a cylindrical body part whose surface is insulated with an insulating layer, a positive electrode terminal protruding from one end of the body part and a negative electrode terminal located and exposed at the other end of the body part, the positive-electrode-side contact terminal and the negative-electrode-side contact terminal being brought into contact with the positive electrode terminal and the negative electrode terminal, respectively, of the cylindrical secondary battery, wherein the terminal structure satisfies the relationships of $$D1 < T1 < D2$$

and $$T1 < T2 = D2$$

where D1 is the length of the body part, D2 is the total length of the cylindrical secondary battery corresponding to a length from the tip of the positive electrode terminal to the negative electrode terminal, T1 is an inter-contact-terminal distance when the cylindrical secondary battery is not present between the positive-electrode-side contact terminal and the negative-electrode-side contact terminal, the inter-contact-terminal distance being the length between a portion of the positive-electrode-side contact terminal which comes into contact with the positive electrode terminal and a portion of the negative-electrode-side contact terminal which comes into contact with the negative electrode terminal, and T2 is the inter-contact-terminal distance when the cylindrical secondary battery is held between the positive-electrode-side contact terminal and the negative-electrode-side contact terminal.

A second aspect of the present invention is the terminal structure according to the first aspect of the present invention, wherein the apparatus is a charging device that charges the cylindrical secondary battery.

A third aspect of the present invention is the terminal structure according to the second aspect of the present invention, wherein the charging device is an automatic charging device including: a hopper for inserting a plurality of the cylindrical secondary batteries; a charging section for sequentially charging the cylindrical secondary batteries inserted in the hopper; a battery chute for collecting the cylindrical secondary batteries which have completed charging in the charging section; and a barrel for guiding the cylindrical secondary batteries from the hopper to the battery chute via the charging section, and the positive-electrode-side contact terminal and the negative-electrode-side contact terminal are provided in the charging section.

A fourth aspect of the present invention is the terminal structure according to the first aspect of the present invention, wherein the apparatus is a battery-driven apparatus that receives supply of electricity by electric discharge of the cylindrical secondary battery.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A terminal structure for a positive-electrode-side contact terminal and a negative-electrode-side contact terminal in an apparatus to be loaded with a cylindrical secondary battery, the cylindrical secondary battery including a cylindrical body part whose surface is insulated with an insulating layer, a positive electrode terminal protruding from a first end of the cylindrical body part and a negative electrode terminal located and exposed at a second end of the cylindrical body part, the positive-electrode-side contact terminal and the negative-electrode-side contact terminal being configured to contact the positive electrode terminal and the negative electrode terminal, respectively, of the cylindrical secondary battery, wherein the terminal structure satisfies relationships of $$D1 < T1 < D2 \text{ and}$$

$$T1 < T2 = D2$$

where D1 is a length of the cylindrical body part, D2 is a total length of the cylindrical secondary battery corresponding to a length from a tip of the positive electrode terminal to the negative electrode terminal, T1 is a first inter-contact-terminal distance between a portion of the positive-electrode-side contact terminal and a portion of and the negative-electrode-side contact terminal when the cylindrical secondary battery is not present between the positive-electrode-side contact terminal and the negative-electrode-side contact terminal, and T2 is a second inter-contact-terminal distance between the portion of the positive-electrode-side contact terminal and the portion of and the negative-electrode-side contact terminal when the cylindrical secondary battery is held between the positive-electrode-side contact terminal and the negative-electrode-side contact terminal, wherein the portion of the positive-electrode-side contact terminal and the portion of the negative-electrode-side terminal contact the positive electrode terminal and the negative electrode terminal of the cylindrical secondary battery, respectively.

2. The terminal structure according to claim 1, wherein the apparatus is a charging device that charges the cylindrical secondary battery.

3. The terminal structure according to claim 2, wherein the charging device is an automatic charging device comprising: a hopper for inserting a plurality of the cylindrical secondary batteries; a charging section for sequentially charging the plurality of cylindrical secondary batteries inserted in the hopper; a battery chute for collecting the plurality of cylindrical secondary batteries which have completed charging in the charging section; and a barrel for guiding the plurality of cylindrical secondary batteries from the hopper to the battery chute via the charging section, and the positive-electrode-side contact terminal and the negative-electrode-side contact terminal are provided in the charging section.

4. The terminal structure according to claim 1, wherein the apparatus is a battery-driven apparatus that receives a supply of electricity by electric discharge of the cylindrical secondary battery.

\* \* \* \* \*